(12) United States Patent
Anderson et al.

(10) Patent No.: US 9,064,246 B1
(45) Date of Patent: Jun. 23, 2015

(54) PAYMENT SERVICE AND PLATFORM AUTHENTICATION INTEGRATION

(75) Inventors: Keith Anderson, Overland Park, KS (US); Christopher J. Bierbaum, Overland Park, KS (US); Allison A. DiMartino, Overland Park, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1091 days.

(21) Appl. No.: 12/578,415

(22) Filed: Oct. 13, 2009

(51) Int. Cl.
| | |
|---|---|
| G06Q 99/00 | (2006.01) |
| G06Q 20/00 | (2012.01) |
| G06Q 20/22 | (2012.01) |
| G06Q 20/32 | (2012.01) |
| G06Q 20/08 | (2012.01) |

(52) U.S. Cl.
CPC .............. *G06Q 20/00* (2013.01); *G06Q 20/227* (2013.01); *G06Q 20/22* (2013.01); *G06Q 20/3223* (2013.01); *G06Q 20/32* (2013.01); *G06Q 20/08* (2013.01)

(58) Field of Classification Search
CPC ..... G06Q 20/00; G06Q 20/227; G06Q 20/22; G06Q 20/3223; G06Q 20/32; G06Q 20/08
USPC .......................... 705/65, 40, 26.41, 26.42, 44
See application file for complete search history.

(56) References Cited

U.S. PATENT DOCUMENTS

| | | | | |
|---|---|---|---|---|
| 7,155,411 | B1* | 12/2006 | Blinn et al. | 705/40 |
| 7,245,902 | B2* | 7/2007 | Hawkes | 455/411 |
| 7,630,937 | B1* | 12/2009 | Mo et al. | 705/39 |
| 7,690,580 | B2* | 4/2010 | Shoemaker | 235/493 |
| 8,069,121 | B2* | 11/2011 | Goodrich et al. | 705/75 |
| 2002/0038287 | A1* | 3/2002 | Villaret et al. | 705/41 |
| 2002/0052841 | A1* | 5/2002 | Guthrie et al. | 705/40 |
| 2005/0256802 | A1* | 11/2005 | Ammermann et al. | 705/44 |
| 2008/0010196 | A1* | 1/2008 | Rackley III et al. | 705/40 |
| 2008/0116285 | A1* | 5/2008 | Shoemaker | 235/493 |
| 2008/0201769 | A1* | 8/2008 | Finn | 726/7 |
| 2009/0281904 | A1* | 11/2009 | Pharris | 705/17 |
| 2009/0292619 | A1* | 11/2009 | Kagan et al. | 705/26 |
| 2009/0298427 | A1* | 12/2009 | Wilkinson et al. | 455/41.1 |
| 2009/0299878 | A1* | 12/2009 | Keresman et al. | 705/27 |
| 2010/0030697 | A1* | 2/2010 | Goodrich et al. | 705/75 |
| 2010/0082445 | A1* | 4/2010 | Hodge et al. | 705/21 |
| 2010/0174626 | A1* | 7/2010 | Stringfellow et al. | 705/30 |

\* cited by examiner

*Primary Examiner* — James D Nigh (57) ABSTRACT

A mobile payment services integration system is provided. The system comprises a computer system and an application, that when executed on the computer system, maintains a list of payment options associated with a portable electronic device. The system also authenticates an identity of the portable electronic device in connection with a first online purchase transaction with a first online merchant. The system also orders payment using one of the payment options to the first online merchant. The system also authenticates the identity of the portable electronic device in connection with a second online purchase transaction with a second online merchant, where the first online merchant is unaffiliated with the second online merchant. The system also orders payment using one of the payment options to the second online merchant.

15 Claims, 6 Drawing Sheets

PAYMENT SERVICE AND PLATFORM AUTHENTICATION INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Online merchants sell a variety of products including software, music, and video content that may be sent directly to a purchasing device for immediate enjoyment. Online merchants sell services such as legal counsel, financial services, and airline tickets and other travel products that may be provided on a real time basis or subsequently provided to the customer. Online merchants also sell hard goods including books, appliances, furniture, apparel, and music and movies provided on compact disks or digital versatile discs. Customers of online merchants shop and make purchases from desktop computers and a plurality of portable electronic devices. Customers may pay for goods and services purchased online using a variety of methods including credit card accounts, bank demand deposit accounts using a debit card, and online payment services. Technical advances in portable electronic devices including larger display screens, richer graphics, and greater processing power enable these devices to view more detailed demonstrations of products provided by online merchants. Faster transmission speeds and flat data rate plans allow portable electronic devices to receive purchased software, music, and video content products almost instantaneously. Increase of overall bandwidth enables smaller vendors to access an expanding population of online shoppers.

SUMMARY

In an embodiment, a mobile payment services integration system is provided. The system comprises a computer system and an application, that when executed on the computer system, maintains a list of payment options associated with a portable electronic device. The system also authenticates an identity of the portable electronic device in connection with a first online purchase transaction with a first online merchant. The system also orders payment using one of the payment options to the first online merchant. The system also authenticates the identity of the portable electronic device in connection with a second online purchase transaction with a second online merchant, where the first online merchant is unaffiliated with the second online merchant. The system also orders payment using one of the payment options to the second online merchant.

In another embodiment, a processor-implemented method of payment service and platform authentication integration is provided. The method comprises a portable electronic device sending a first message to an online merchant in association with an online transaction, the first message comprising identifying information linked to the portable electronic device. The method also comprises the online merchant sending a second message to a mobile payment server furnishing the identifying information. The method also comprises the mobile payment server using the identifying information to authenticate the portable electronic device. When the mobile payment server has successfully authenticated the portable electronic device, the method also comprises the mobile payment server sending a third message to the online merchant providing a list of prearranged payment options associated with the portable electronic device wherein the third message excludes account details associated with the prearranged payment options.

In an embodiment, a processor-implemented method of payment service and platform authentication integration is provided. The method comprises an online merchant sending a first message to a mobile payment server requesting available payment options for a portable electronic device to complete a transaction with the online merchant. The method also comprises the mobile payment server sending a second message to the portable electronic device containing available payment options to complete a transaction with the online merchant, wherein the second message does not contain secure account information associated with the payment options. The method also comprises the online merchant sending a third message to the mobile payment server containing the selected payment option and requesting payment for the transaction using the selected payment option. The method also comprises the mobile payment server sending a fourth message to a payment services provider associated with the selected payment option requesting payment to the online merchant for the transaction. The method also comprises the payment services provider processing payment to the online merchant. The method also comprises the payment services provider sending a fifth message to the mobile payment server providing a confirmation of payment to the online merchant. The method also comprises the mobile payment server sending a sixth message to the online merchant notifying the online merchant that the payment for the transaction by the payment services provider has been processed.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a mobile payment service integration system permit a portable electronic device, for example a mobile telephone, to be presented a previously registered list of payment options while making a remote purchase and/or an online purchase with the portable electronic device, and with a single keystroke or click to choose a payment method and complete the transaction. During a sale, when an online merchant recognizes the portable electronic device as a subscriber to the system, it contacts a mobile payment server. The mobile payment server verifies the identity of the portable electronic device using the network access identifier or other designation associated with the portable electronic device. The mobile payment server replies to the online merchant with a qualified list of online payment options previously registered by subscriber that owns the portable electronic device with the system. The online merchant provides the list to the portable electronic device and requests the portable electronic device to choose the payment option from the list it intends to use for the transaction. The payment option selected by the portable electronic device is relayed by the online merchant to the mobile payment server which then contacts a payment services provider corresponding to the chosen payment option. The mobile payment server provides the transaction information to the payment services provider including the identity of the online merchant and the amount of the transaction. The payment services provider then makes payment to the online merchant and advises the mobile payment server of this action. The mobile payment server notifies the online merchant that it has been paid and the transaction is concluded.

The present disclosure addresses the integration of customer authentication services and payment services into the virtual storefront of the online merchant. The portable electronic device presents only the graphical interface of the online merchant. The online merchant in its interface embeds and abstracts from the portable electronic device the presentation and interactions of the mobile payment server and payment services providers. This provides the online merchant complete virtual control of the customer interface and direction of the customer experience. The user of the portable electronic device by previously registering its payment methods receives the benefits of choice, security, and control as well as the convenience of making online purchases with as little as a single keystroke.

The portable electronic device in making its purchase may be presented only a list of payment options. The other interactions described are not visible to the portable electronic device. The online merchant electronically recognizes that the portable electronic device is a subscriber to the service provided by the system, contacts the mobile payment server for available payment options, presents the payment options to the portable electronic device for its selection, and passes the selection made back to the mobile payment server. The online merchant shortly receives notice that it has been paid. The online merchant sees no account details for the choice made by the portable electronic device. Each of these steps may take place with minimal or no action by the online merchant and the portable electronic device and may complete in a matter of seconds. In an embodiment, the portable electronic device may designate a default payment method to use unless it specifically chooses otherwise. With each online transaction the portable electronic device is presented only the default payment method for selection but is given the option to be shown the full list of previously stored payment methods if the portable electronic device chooses not to use the default payment method for any reason.

Many of the system's interactions are transparent to both the portable electronic device and the online merchant. The online merchant may present the only interface visible to the portable electronic device and may control contact the portable electronic device has with the system. The existence and actions of the mobile payment server and payment service providers are not apparent to the portable electronic device. The subscriber using the portable electronic device normally does not need to specifically identify himself/herself or provide authentication when shopping with the portable electronic device because the network access identifier of the portable electronic device or other identification passed to the mobile payment server can be used to matched the portable electronic device with the subscriber and his/her registered payment options. Under some circumstances, for example when an online purchase is unusually large, credentials such as a password or personal identification number (PIN), may be requested of the portable electronic device. Credentials also may be requested when a delivery address for purchased goods is specified that does not match a billing address on file with the payment server or payment services provider for the portable electronic device or does not otherwise match entries in an address book associated with the portable electronic device.

When initially establishing its service relationship, the subscriber, via the portable electronic device, registers his/her payment options. The mobile payment server securely stores and integrates the payment options for the use of the portable electronic device in making online transactions. The portable electronic device may provide alias designations for payment options to further secure its credit information, and an online merchant would only receive these aliases for presentation to the portable electronic device during a transaction. Communications between the mobile payment server and payment service providers are not accessible to online merchants, and, upon receiving payment in a transaction, online merchants receive only the funds and the identity of the transaction and no account information for the portable electronic device. When a transaction is concluded, the online merchant's session with the portable electronic device may remain open for additional transactions to be completed. Payment options stored by the mobile payment server for use by the portable electronic device in making online purchases may include credit card accounts, bank account debit accounts, and online payment services.

Figure 1:
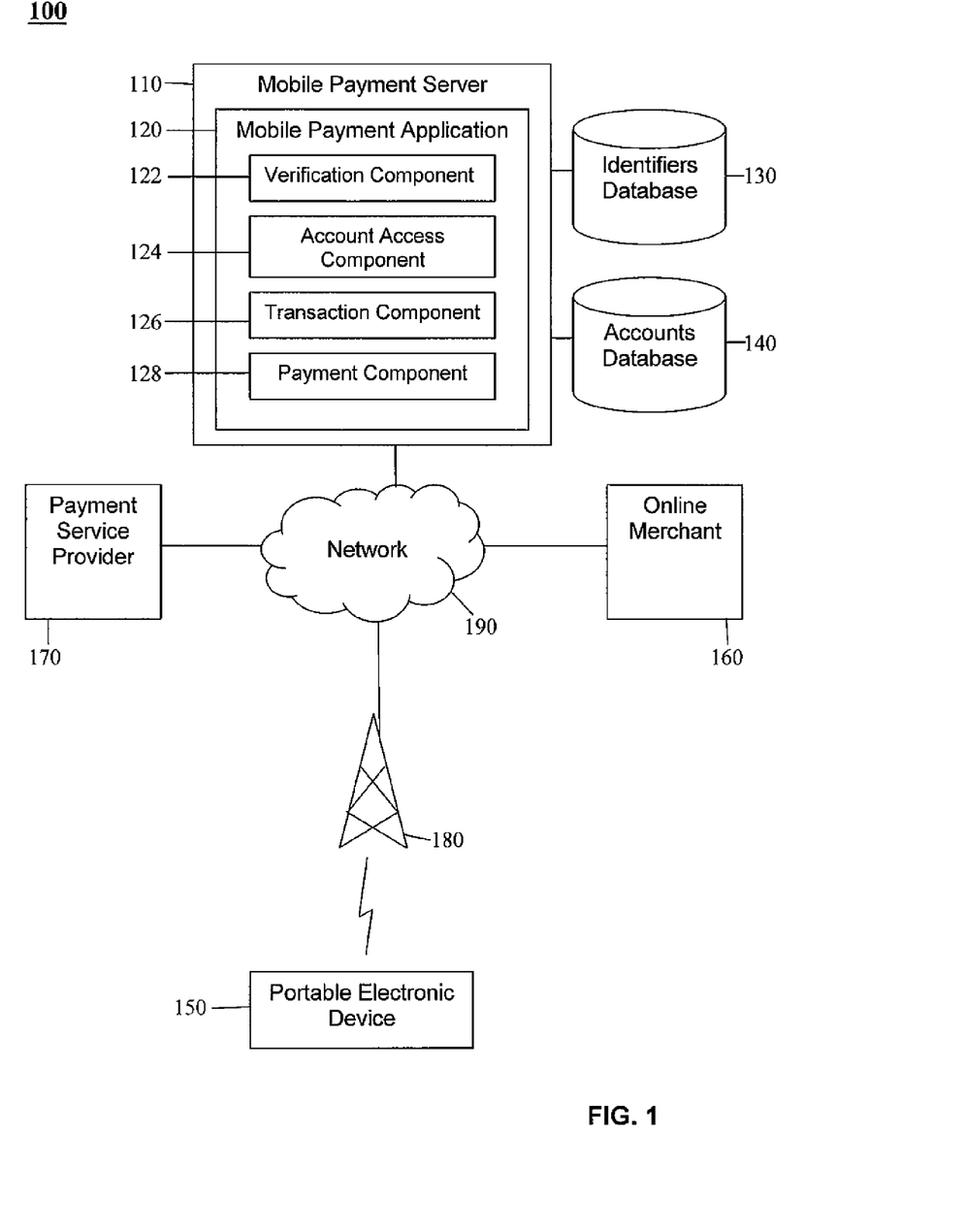
FIG. 1 is a block diagram of a system according to an embodiment of the disclosure.

Turning now to FIG. 1, a system 100 for mobile payment service integration is provided. The system 100 comprises a mobile payment server 110, a mobile payment application 120, an identifiers database 130, an accounts database 140, a portable electronic device 150, an online merchant 160, a payment services provider 170, a base transceiver station 180, and a network 190.

The mobile payment server 110 may be a computer system. Computer systems are discussed in greater detail hereinafter. The mobile payment server 110 may comprise one computer or a plurality of computers, for example, a server farm wherein many server computers cooperate to share a processing load. The mobile payment server 110 may comprise a plurality of computers that are located at different places, for example, to provide geographical diversity and increased service reliability. The mobile payment server 110 executes one or more applications that provide services including hosting of the mobile payment application 120.

The mobile payment application 120 executes on the mobile payment server 110 and provides payment processing services for online merchants 160 and their customer's portable electronic devices 150. The mobile payment application 120 integrates and presents stored payment methods for use in completing online transactions. The mobile payment application 120 receives messages from online merchants 160 containing information identifying portable electronic devices 150 and details of purchase transactions the portable electronic devices 150 are seeking to complete using payment methods previously registered by the portable electronic devices 150 with the mobile payment application 120. The mobile payment application 120 uses the network access identifier (NAI) or other designation for a portable electronic device 150 to verify that the portable electronic device 150 is registered with the mobile payment application 120 and has one or more forms of payment on file with the mobile payment application 120. Once verification is complete, the mobile payment application 120 examines the information about the transaction the online merchant 160 is seeking to complete with the portable electronic device 150. The mobile payment application 120 examines the payment methods previously registered with it by the portable electronic device 150 and determines the payment methods that may be used by the portable electronic device 150 to complete the contemplated transaction. After providing these methods to the online merchant 160 and receiving in return from the online merchant 160 the choice of payment method made by the portable electronic device 150, the mobile payment application 120 contacts the payment services provider 170, for example an online payment services provider, associated with the chosen payment method. The mobile payment application 120 provides payment information to the payment services provider 170 and requests the payment services provider 170 to make payment to the account of the online merchant 160. Once this is complete, the mobile payment application 120 notifies the online merchant 160 that payment to it has been made and the transaction is completed.

The mobile payment application 120 comprises the verification component 122 that receives the network access identifier (NAI), mobile device number (MDN), international mobile subscriber identity (IMSI), or other identifying information for the portable electronic device 150. This information was provided to the online merchant 160 by the portable electronic device 150, and the online merchant 160 relays the information to the verification component 122 when seeking payment for its sale transaction. In an embodiment, the identifying information may be conveyed automatically from the portable electronic device 150 to the online merchant 160 as a portion of the message sent by the portable electronic device 150 to initiate shopping at the online site. This automatic transmission of identifying information and the authentication and/or verification of the portable electronic device 150 based on the automatically transmitted identifying information may relieve a user of the portable electronic device 150 of the burden of entering a user id and a password and perhaps stopping an in-progress purchase due to having forgotten a password. The verification component 122 compares the network access identifier or other information to information in the identifiers database 130 associated with the portable electronic device 150. The verification component 122 seeks to match the network access identifier provided by the online merchant 160 on behalf of the portable electronic device 150 with a network access identifier stored in the identifiers database 130 and thereby determine that the portable electronic device 150 has previously registered and is eligible to pay for goods using the mobile payment application 120. Using only the network access identifier or other information associated with the portable electronic device 150 to verify the identity of the party seeking to make an online purchase and not requiring further authentication may be sufficient in authorizing payment for a sale transaction.

If a transaction exceeds a predetermined amount or is determined to be significantly out of character for a portable electronic device 150, given its previous online purchasing history, in an embodiment, the verification component 122 may request a user name, password, and/or personal identification number (PIN) from the portable electronic device 150. If the delivery address for purchased goods is specified that does not match a billing address on file for the portable electronic device 150 or does not otherwise match entries in an address book associated with the portable electronic device 150, additional credentials may be requested. If the verification component 122 is unable to locate a network access identifier in the identifiers database 130 that matches the network access identifier provided by the online merchant 160 on behalf of the portable electronic device 150, the verification component 122 may require authentication regardless of the specifics of the transaction. If the verification component 122 cannot verify the network access identifier or other information provided, and the portable electronic device 150 does not provide sufficient authentication, the mobile payment application 120 may decline the payment.

Providing its network access identifier to the online merchant 160 requires little action by the portable electronic device 150. When the portable electronic device 150 initiates contact with the online merchant 160 to begin shopping and perhaps make a purchase, the online merchant 160 may recognize the network access identifier associated with the portable electronic device 150. The online merchant 160 also may recognize that the portable electronic device 150 is registered with the mobile payment application 120 and hence able to purchase goods using a stored payment method. The actions by the online merchant 160 of reading the network access identifier associated with the portable electronic device 150, recognizing that the portable electronic device 150 may be registered with the mobile payment application 120, verifying with the verification component 122 the registration of the portable electronic device 150, and generating the available payment methods may all be taken with minimal action by the portable electronic device 150 and may occur in a short period, for example a few seconds.

The mobile payment application 120 also comprises the account access component 124 that accesses the accounts database 140 to determine the payment methods previously registered by the portable electronic device 150 with the mobile payment application 120. The payment methods may comprise credit card accounts, bank deposit accounts accessible by debit card or other method, online payment service providers, or other payment alternatives. After the verification component 122 has verified the identity of the portable electronic device 150, the account access component 124 then searches the accounts database 140 to determine which of the registered payment methods may be used to complete the transaction submitted by the online merchant 160. In an embodiment, not all of the registered payment methods for a portable electronic device 150 may be used to complete a certain transaction. Some online merchants 160 may accept payment from only certain payment services providers 170. Some payment services provider 170 may do business with only certain online merchants 160 or may have restrictions about the minimum and maximum sizes of transactions they may wish to process for online merchants 160. Some payment services providers 170 may have requirements regarding sales tax collection and remittance and jurisdictions in which sales may be made that some online merchants 160 may find commercially unacceptable.

The account access component 124 reviews the amount of the transaction submitted by the online merchant 160 and business requirements of the online merchant 160, the payment services provider 170, and perhaps the portable electronic device 150. After this review is complete, the account access component 124 compiles a list of the registered payment methods that may be used by the portable electronic device 150 to conclude the transaction. In an embodiment, the portable electronic device 150 may have specified a default payment method, for example a specific credit card or debit card account, that is to be used for all transactions, for transactions of a certain type, or for transactions exceeding or below a specific amount. In an embodiment, if the account access component 124 determines that the contemplated transaction may be completed using the default payment method, the account access component 124 does not compile a list of registered payment methods and instead provides advice that the default payment method may be used.

The account access component 124, as the primary component accessing the accounts database 140, also adds new payment methods to the accounts database 140 when provided by the portable electronic device 150 and deletes payment methods as directed. The account access component 124 may provide an application programming interface or other interface that permits direct access to the mobile payment application 120 by the portable electronic device 150 for making payment account changes when a transaction with an online merchant 160 is not involved. In an embodiment, a user of the portable electronic device 150 may make changes to a set of payment methods stored in the accounts database 140 from a remote computer.

The mobile payment application 120 also comprises the transaction component 126 that handles interactions related to the receipt, processing, and completion of, as well as messaging about requests for payment arising from online transactions. In an embodiment, the online merchant 160 communicates with the mobile payment application 120 via the transaction component 126. The transaction component 126 coordinates the interactions of the other components of the mobile payment application 120 with the online merchant 160. The transaction component 126 is the component with which the online merchant 160 interacts when it is completing a transaction with the mobile payment application 120. The transaction component 126 also may not generally interact directly with the identifiers database 130, the accounts database 140, or payment services providers 170 as interactions with these components are primarily the function of the verification component 122, the account access component 124, and the payment component 128, described below, respectively. The transaction component 126 receives the initial communication from the online merchant 160 indicating that a portable electronic device 150 may seek to use a payment method registered with the mobile payment application 120 to complete a purchase transaction. The transaction component 126 logs the initial contact and may request the verification component 122 to attempt to verify the identity of the portable electronic device 150 using the network access identifier received in the initial contact. The transaction component 126 may handle any requests for authentication made by the verification component 122. While the online merchant 160 controls the interface and interactions with the portable electronic device 150, components of the mobile payment application 120 may require information from the portable electronic device 150 during a transaction. The transaction component 126 communicates to the online merchant 160 the need for information from the portable electronic device 150 to complete payment.

The transaction component 126 also provides a list of available payment options for a given transaction to the online merchant 160 generated by the account access component 124. The payment options may be displayed in the form of alias designations created previously by the portable electronic device 150. The list of available payment options may be created by the account access component 124 and embedded by the transaction component 126 into the interface of the online merchant 160, for example stitched into the hypertext markup language (HTML) file associated with a purchase web page provided by the online merchant 160 to the portable electronic device 150. The transaction component 126 subsequently receives the choice of payment methods made by the portable electronic device 150 and finally communicates with the online merchant 160 when payment from the payment services provider 170 has been completed.

The mobile payment application 120 also comprises the payment component 128 that interacts with the chosen payment services provider 170 after the payment method has been selected by the portable electronic device 150 and the transaction is ready to be completed with payment made to the account of the online merchant 160. The payment component 128 provides information to the chosen payment services provider 170 about the identification of the online merchant 160 to whom payment should be directed, bank deposit account or other remittance information associated with the online merchant 160, and supplementary remittances for sales tax, shipping, insurance, and other amounts payable under the transaction. The payment component 128 maintains contact with the payment services provider 170 as it makes payments required to complete the transaction. The payment component 128 reports to the transaction component 126 when payment is complete. The payment component 128 may provide an official payment code, remittance advice, or confirmation generated by the payment services provider 170 to certify that payment was made to the account of the online merchant 160. The credit advice is passed on by the transaction component 126 to the online merchant 160 as confirmation that payment has been made. The online merchant 160 may not be advised of the identity of the payment services provider 170 or the payment method used by the portable electronic device 150. In an embodiment, the credit advice provided by the transaction component 126 on behalf of the payment services provider 170 may be the only information required by the online merchant 160.

The identifiers database 130 is associated with the mobile payment server 110 and stores network access identifiers, mobile device numbers, and other information that identifies portable electronic devices 150 that are registered with the mobile payment application 120 to complete online transactions using stored payment methods. The verification component 122 searches the identifiers database 130 and compares identifiers stored in the identifiers database 130 with information identifying a portable electronic device 150 received from an online merchant 160. The verification component 122 seeks to match identifying information about portable electronic devices 150 completing transactions with identifying information found in the identifiers database 130.

The accounts database 140 is associated with the mobile payment server 110 and stores payment account information previously furnished by portable electronic devices 150 to the mobile payment application 120 for use in making online transactions. The accounts database 140 may store information associated with credit card accounts, bank deposit accounts accessible by debit card numbers, online payment providers, and other electronic payment methods. When a portable electronic device 150 establishes a relationship with the mobile payment application 120 to enable making electronic payments for online transactions, it provides information for payment accounts it may intend to use and this information is stored in the accounts database 140. The information is accessed and analyzed by the account access component 124 when the transaction component 126 receives a request for processing of a transaction from an online merchant 160.

The portable electronic device 150 contacts online merchants 160 to electronically shop for goods and services. The portable electronic device 150 may be a mobile telephone, a personal digital assistant (PDA), tablet computer, or a laptop computer. The portable electronic device 150 may contact online merchants 160 to engage in online shopping using a variety of methods including a web browser. The portable electronic device 150 also may make audible contact with online merchants 160 and make choices using voice-activated commands or by using the keypad or graphical user interface of the portable electronic device 150.

The online merchant 160 sells goods and services and executes other transactions with portable electronic devices 150. The online merchant 160 may sell software for use on the portable electronic device 150 that is instantaneously delivered to and installed on the portable electronic device 150. The online merchant 160 may sell software, electronic products such as music, literature, video, and graphic content, and other soft content that is delivered electronically for use on devices other than the portable electronic device 150. The online merchant 160 may sell hard goods such as electronic devices, appliances, books, furniture, clothing, and music and video content provided on digital versatile disks (DVD) or other media that are subsequently delivered to the user of the portable electronic device 150 or other party. The online merchant 160 may sell services such as airline or other travel arrangements and financial services. The online merchant 160 may be associated with retail merchants that operate physical retail locations.

The online merchant 160 may use custom software created to function with the components of the mobile payment application 120. The software may allow, for example, portions of an electronic document created by the mobile payment application 120 using hypertext markup language (HTML) to be embedded into a web page of the online merchant 160 and appear seamless such that the actions and identity of the mobile payment application 120 are not apparent. The embedded portion of the electronic document created by the mobile payment application 120 might contain the list of available payment options with instructions to the portable electronic device 150 to choose one. The embedded portion might contain dialogue boxes that permit the portable electronic device 150 to enter credentials when these are required. While in this instance the portable electronic device 150 is entering credentials into a web page presented and apparently created by the online merchant 160, in fact the credentials may be encrypted before they are passed through the infrastructure of the online merchant 160 and on to the mobile payment application 120.

Payment services providers 170 are credit card companies, banks, online payment services, and other payment entities that make payments to online merchants 160 at the direction of the mobile payment application 120. Payment services providers 170 are designated by portable electronic devices 150 when they establish a relationship with the mobile payment application 120 to enable payment for purchases and other transactions made with online merchants 160. Information about payment services providers 170 provided by portable electronic devices 150 is stored in the accounts database 140 and accessible by the account access component 124.

The base transceiver station 180 may be any of a cellular wireless base station, for example a Code Division Multiple Access (CDMA), Global System for Mobile Communications (GSM), and/or Universal Mobile Communications System (UMTS) cellular wireless base station; a World-wide Interoperable Microwave Access (WiMAX) base station; a WiFi access point; Long-Term Evolution (LTE); or other wireless access device.

The portable electronic device 150 is depicted in FIG. 1 as communicating wirelessly via the base transceiver station 180 with the other components of the system 100. It is understood that in some embodiments the portable electronic device 150 may communicate with the other components of the system 100 using other communications technologies including wired links and the base transceiver station 180 may not be used. While one portable electronic device 150 and one base transceiver station 180 are illustrated in FIG. 1, it is understood that the system 100 may comprise any number of these devices.

The network 190 promotes communication between the components of the system 100. The network 190 may be any communication network including a public data network (PDN), a public switched telephone network (PSTN), a private network, and/or a combination thereof.

Figure 2:
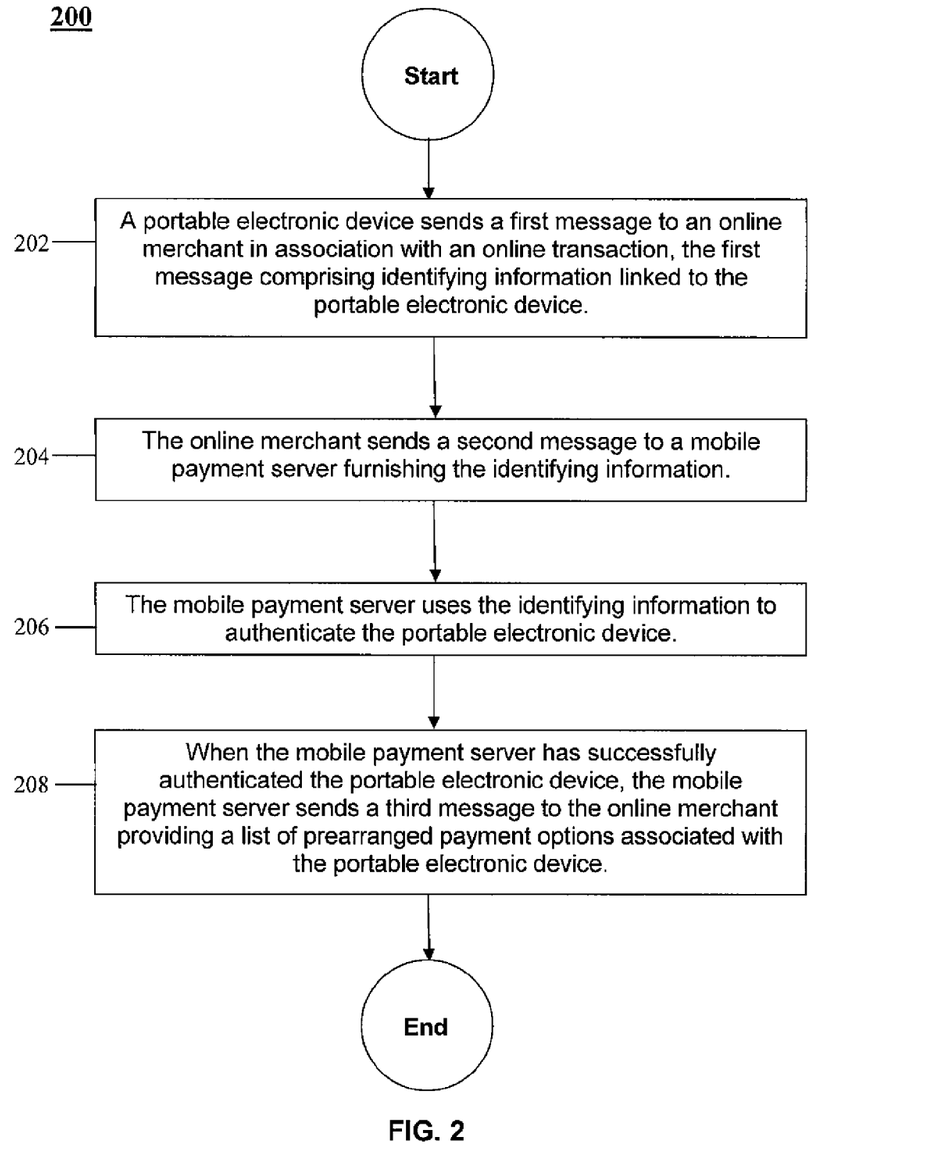
FIG. 2 is a flow chart illustrating a method according to an embodiment of the disclosure.

Turning now to FIG. 2, a processor-implemented method 200 of payment service and platform authentication integration is provided. Beginning at block 202, a portable electronic device 150 sends a first message to an online merchant 160 furnishing identifying information while engaging in a transaction with the online merchant 160. The identifying information, that may comprise the NAI, MBN, IMSI, or other identifying information for the portable electronic device 150, may be passed automatically to the online merchant 160 without intervention by the user of the portable electronic device 150. The conveying of the identifying information may occur when the portable electronic device 150 logs into the online merchant 160 and may not require a transaction to be initiated.

At block 204, the online merchant 160 sends a second message to the mobile payment server 110 furnishing the identifying information received from the portable electronic device 150 at block 202. The online merchant 160 sends the identifying information because the portable electronic device 150 has indicated that it may wish to consummate a purchase with the online merchant 160. The portable electronic device 150 may have stated or otherwise disclosed that it wishes to use a payment method on file with the mobile payment application 120, or the online merchant 160 may have detected that the portable electronic device 150 has an established relationship with the mobile payment application 120.

At block 206, the verification component 122 of the mobile payment application 120 uses the identifying information received at block 204 to search the identifiers database 130 to match the received identifying information with at least one of a NAI, MBN, or other identifying information stored in the identifiers database 130. The verification component 122, by positively matching the identifying information received at block 204 with a record in the identifiers database 130, determines that the portable electronic device 150 is registered with the system 100 and may have payment methods on file with the system in the accounts database 140. After the verification component 122 at block 206 makes this positive match and determination, the account access component 124 subsequently at block 206 searches the accounts database 140 for stored payment accounts that the portable electronic device 150 may use in completing a contemplated transaction with the online merchant 160. In an embodiment, the online merchant 160 may have provided information about the contemplated transaction earlier in the method 200 to enable the account access component 124 to qualify certain stored payment methods and disqualify other stored payment methods as candidate methods for use in completing the transaction. At block 206, the account access component 124 determines the stored payment method(s) that the portable electronic device 150 may use. If the portable electronic device 150 has designated a default payment method, the account access component 124 will determine if it may be used.

At block 208, the transaction component 126 of the mobile payment application 120 sends a third message to the online merchant 160 confirming that the portable electronic device 150 has been identified as eligible to complete the contemplated transaction using a payment method stored with the mobile payment application 120. The transaction component 126 provides the eligible payment method(s) to the online merchant 160.

Figure 3:
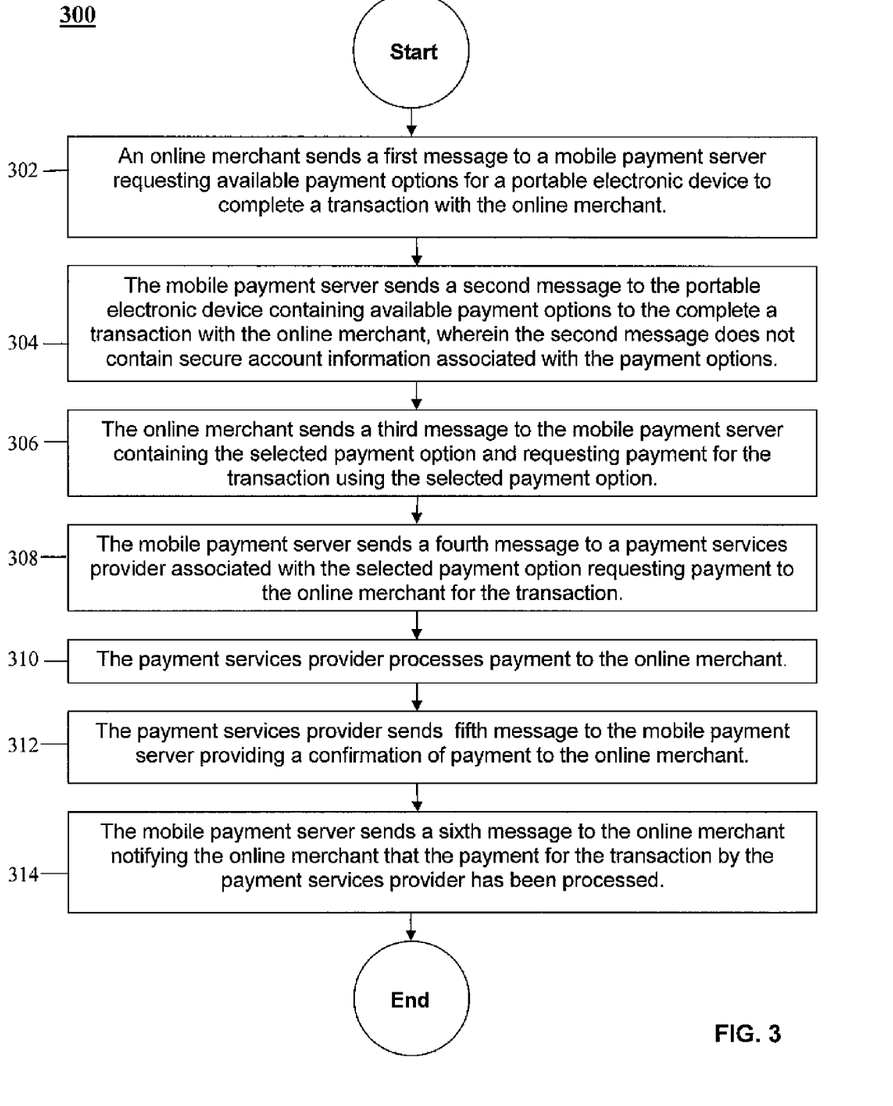
FIG. 3 is a flow chart illustrating another method according to an embodiment of the disclosure.

Turning now to FIG. 3, a processor-implemented method 300 of payment service and platform authentication integration is provided. Beginning at block 302, an online merchant 160 sends a first message to a mobile payment server 110 requesting prearranged payment options that a portable electronic device 150 may use in completing an online transaction with the online merchant 160. At block 304, the mobile payment server 110 sends a second message to the portable electronic device 150 containing the payment options requested by the online merchant 160 at block 302. The second message includes payment options available to the portable electronic device 150 but does not include account information related to the payment options. For example, in an embodiment, the second message may identify a payment option as "Credit Card X of Robert R Roberts" but not include confidential account and/or financial information such as an account number, an authorization number, or a PIN. Other account information that is not made visible is additional identifying information, for example the customer's social security number or the security code on the customer's credit card. Credit information, such as the customer's credit score or credit history that might be on file or otherwise accessible to the mobile payment server 110, would also not be transmitted. Additional names, account expiration dates, and credit limits on a customer account would also not be transmitted. Identifying account information also may be referred to as account designation information or account alias information. The exclusion of confidential information may reduce the risk of identity theft, for example reducing the risk of exposing confidential information associated with a user of the portable electronic device 150 in the event the online merchant 160 is attacked by an electronic criminal and/or identity thief. The mobile payment application 120 will have previously determined through identifying information associated with the portable electronic device 150 that the portable electronic device 150 has previously registered payment methods with the mobile payment application 120. In an embodiment, the steps of the method 300 may be a continuation of the steps of the method 200 with the steps of the method 200 and the method 300 together describing the primary interactions of the components of the system 100 in an embodiment of the present disclosure.

At block 306, the online merchant 160 sends a third message to the mobile payment server 110 providing the prearranged payment options that the portable electronic device 150 selected to complete the transaction. The portable electronic device 150 prior to block 306 will have communicated its selected payment option to the online merchant 160. In an embodiment, the listing of payment options may not be sent in an actual message but may be embedded in a displayed web page of the online merchant 160 that the portable electronic device 150 may view. In addition to providing the listing of payment options, the online merchant 160 at block 304 also provides the portable electronic device 150 a method for choosing the payment method it wishes to use to pay for the goods and/or services being acquired in the online transaction.

At block 308, the mobile payment server sends a fourth message to the payment services provider 170 associated with the selected payment option. The mobile payment server 110 provides the information about the transaction to the payment services provider 170 including deposit account information for the online merchant 160, the amount to be paid to the online merchant 160, and additional payments under the transaction regarding sales tax, shipping, and insurance for the goods involved in the transaction.

At block 310, the payment services provider 170 processes the instructions received at block 308 and makes the requested remittances into the accounts specified. At block 312, the payment services provider 170 sends a sends a fifth message to the mobile payment server 110 providing a confirmation of the payment(s).

At block 314, the mobile payment server 110 sends a sixth message to the online merchant 160 notifying the online merchant 160 that the payment for the transaction has been processed. The notification to the online merchant 160 may comprise an identification of the transaction, the amount that was deposited into the account designated by the online merchant 160, and a confirmation number provided by the payment services provider 170 or the mobile payment application 120. In an embodiment, the identity of the payment services provider 170 may not be disclosed.

The subscriber to services offered by a wireless communications service provider prearranges payment options before the portable electronic device 150 may consummate transactions with the online merchant 160. The prearranged payment options are associated with the subscriber and with the portable electronic 150. If the subscriber changes portable electronic devices 150, the components of the system 100 would associate the prearranged payment options with the new portable electronic device 150. In an embodiment, a portable electronic device 150 may consummate a single transaction by directing payments to be made using two or more payment options. The graphical user interface of the online merchant 160 may present options to the portable electronic device permitting it to direct specific portions of a transaction to be paid using specific prearranged payment options. The payment for the transaction could in effect be broken into component pieces.

Figure 4:
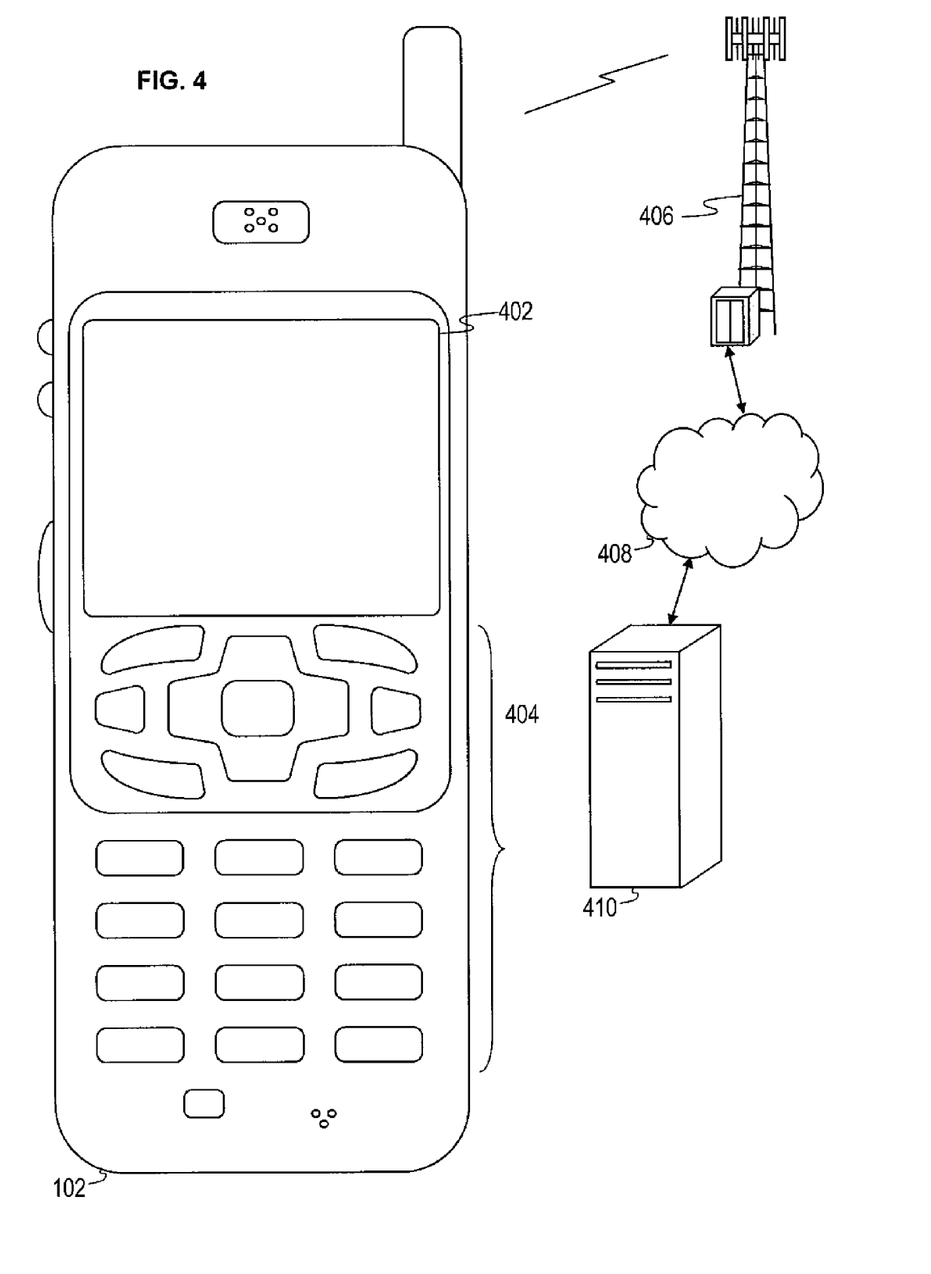
FIG. 4 is an illustration of a mobile device according to an embodiment of the disclosure.

FIG. 4 shows a wireless communications system including the mobile device 102. The mobile device 102 may in some embodiments exemplify the portable electronic device 150. FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
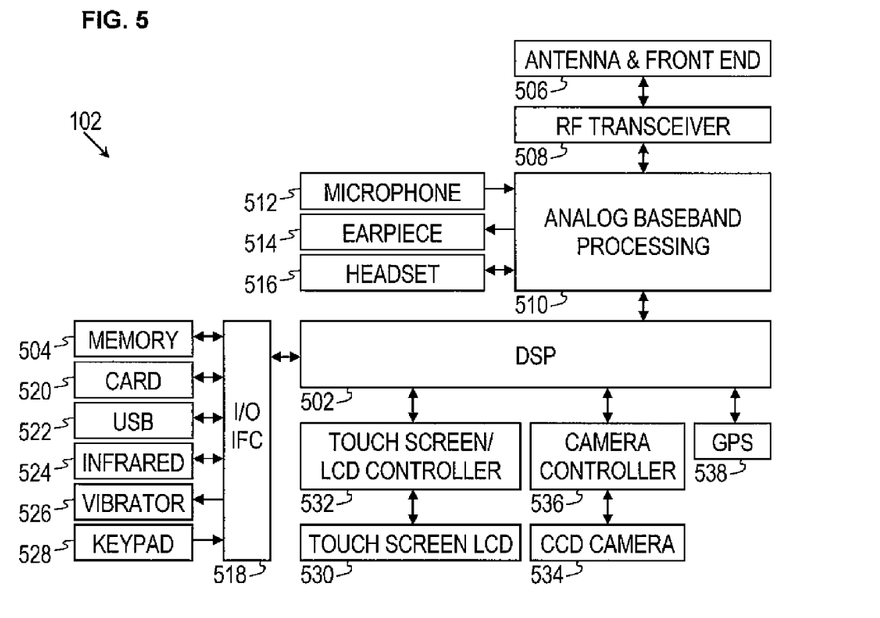
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which also may display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals also may be included to provide additional functions, e.g., radio and television reception.

Figure 6:
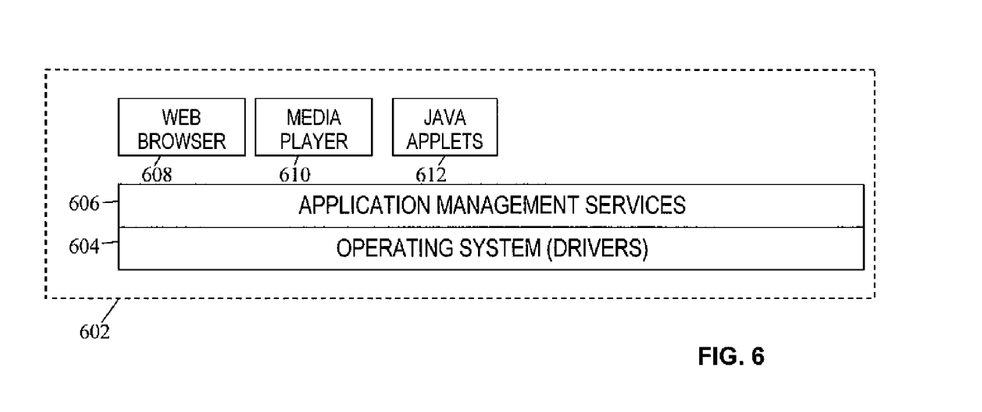
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
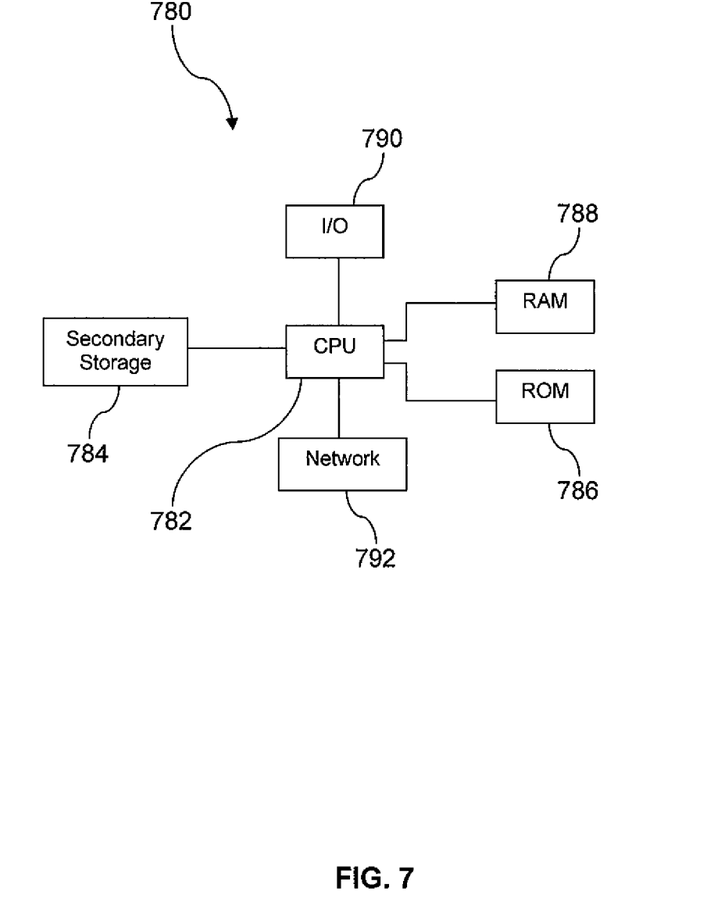
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile payment services integration system, comprising:
   a mobile payment server that includes at least one processor communicatively coupled with a non-transitory memory; and a mobile payment application, comprising computer readable instructions stored in the non-transitory memory, that when executed by the at least one processor of the mobile payment server,
- prearranges a plurality of payment options associated with a portable electronic device prior to an online purchase with the portable electronic device or prior to interaction for a transaction with one of a first online merchant server or a second online merchant server,
- receives identifying information of the portable electronic device via the first online merchant server in a message initiating a first online purchase transaction, wherein the first online merchant communicates with the mobile payment server without receiving or handling account information for the portable electronic device,
- authenticates an identity of the portable electronic device in connection with the first online purchase transaction with the first online merchant server in response to receiving the identifying information from the first online merchant server,
- responsive to authentication of the identity of the portable electronic device, generates a customized list of payment options for the portable electronic device based on the prearranged plurality of payment options, requirements of one or more online merchant servers, requirements of one or more payment services providers, and preferences of the portable electronic device,
- sends the customized list of payment options to the portable electronic device without providing the account information to the first online merchant server,
- receives, from the first online merchant server, a payment option selected by the user of the portable electronic device from the customized list of payment options,
- contacts the payment services provider corresponding to the payment option selected by the user and orders payment by the payment services provider to the first online merchant server, wherein the first online merchant server is provided funds and a transaction identity on behalf of the payment services provider without receiving an account identity or account information for the portable electronic device,
- receives identifying information of the portable electronic device from the second online merchant server in a message initiating a second online purchase transaction, wherein the second online merchant communicates with the mobile payment server without receiving or handling account information for the portable electronic device,
- authenticates the identity of the portable electronic device in connection with the second online purchase transaction with the second online merchant server in response to receiving the identifying information from the second online merchant server, where the first online merchant server is unaffiliated with the second online merchant server, and
- orders payment using one of the payment options to the second online merchant server wherein the second online merchant server is not advised of an account, account information, or an identity of a corresponding payment services provider associated with the payment option used for the second online merchant server.

2. The system of claim 1, wherein the mobile payment server coupled to the mobile payment application further comprises computer readable instructions stored in a non-transitory memory, that when executed on the mobile payment server, provides the payment options to the portable electronic device through the graphical user interfaces of the first online merchant server and the second online merchant server.

3. The system of claim 2, wherein the mobile payment application further comprises computer readable instructions stored in a non-transitory memory, that when executed on the mobile payment server, receives a first payment option selected by the user of the portable electronic device to complete the first online purchase transaction and receives a second payment option selected by the user of the portable electronic device to complete the second online purchase transaction.

4. The system of claim 1, wherein the list of payment options are prearranged by the portable electronic device with the mobile payment application.

5. The system of claim 1, further comprising:
the first online merchant server; and
the second online merchant server,
  wherein the first online merchant server and the second online merchant server are electronically accessible vendors of goods and services and the first online purchase transaction and the second online purchase transaction are completed by the first online merchant server and the second online merchant server without the portable electronic device physically entering a retail location.

6. The system of claim 1, further comprising:
the payment service provider,
  wherein payments are made by the payment service provider associated with the selected payment option.

7. The system of claim 1, wherein the payment options comprise credit card accounts, debit card accounts, and online payment service provider accounts.

8. The system of claim 1, wherein the list of payment options sent to the first online merchant server excludes account details associated with the payment options.

9. The system of claim 1, wherein the mobile payment application further comprises computer readable instructions stored in a non-transitory memory, that when executed on the mobile payment server, sends the list of payment options to the second online merchant for use by the portable electronic device in response to successfully authenticating the identity of the portable electronic device in connection with the second online purchase transaction, wherein the list of payment options excludes account details associated with the payment options.

10. The system of claim 1, wherein the mobile payment application further comprises computer readable instructions stored in a non-transitory memory, that when executed on the mobile payment server, authenticates the identity of the portable electronic device in connection with the first and second online purchase transactions, by verifying the identifying information which comprises at least one of a network address identifier (NAI), a mobile device number (MDN), and an international mobile subscriber identity (IMSI).

11. The system of claim 1, wherein the mobile payment application further comprises computer readable instructions stored in a non-transitory memory, that when executed on the mobile payment server, analyzes the monetary size of the first and second online purchase transactions to determine which of the payment options to provide to the first and second online merchant servers for use by the portable electronic device.

12. The system of claim 1, wherein the mobile payment application further comprises computer readable instructions stored in a non-transitory memory, that when executed on the mobile payment server, requires credentials to be provided by the portable electronic device when the monetary size of the first or second online purchase transaction exceeds a predetermined amount.

13. The system of claim 1, wherein the mobile payment application further comprises computer readable instructions stored in a non-transitory memory, that when executed on the mobile payment server, provides alias designations to payment methods to shield the identity of payment methods from the first and second online merchant servers, wherein the alias designations were previously created by interaction with the portable electronic device.

14. The system of claim 1, wherein the mobile payment application further comprises computer readable instructions stored in a non-transitory memory, that when executed on the mobile payment server, designates one payment method as a default payment method, wherein the default payment method was previously created by the portable electronic device, and wherein the default payment method is used to complete the first and second online purchase transactions unless the portable electronic device chooses an alternate payment method.

15. The system of claim 6, further comprising;
the payment service provider, wherein the payment service provider is one of a credit card processing company, a bank, and an online payment services company.

* * * * *